United States Patent [19]

Vollmer et al.

[11] Patent Number: 4,619,543
[45] Date of Patent: Oct. 28, 1986

[54] COUPLING ASSEMBLY HAVING A RETAINER PLATE FOR GUIDING A COUPLING HOOK

[75] Inventors: Jürgen Vollmer; Alfred Frackenpohl, both of Lohmar, Fed. Rep. of Germany

[73] Assignee: Jean Walterscheid GmbH, Lohmar, Fed. Rep. of Germany

[21] Appl. No.: 713,784

[22] Filed: Mar. 20, 1985

[30] Foreign Application Priority Data

Mar. 21, 1984 [DE] Fed. Rep. of Germany ....... 3410314

[51] Int. Cl.4 ................. F16C 11/06; F16D 3/10
[52] U.S. Cl. ..................... 403/114; 403/122; 403/324; 172/450; 172/677; 280/461 A; 280/460 A
[58] Field of Search ............... 403/114, 115, 122, 324; 172/450, 439, 677, 272, 749; 280/461 A, 460 A, 446 A

[56] References Cited

U.S. PATENT DOCUMENTS

| | | |
|---|---|---|
| 2,673,507 | 3/1954 | Sawyer .................. 280/461 A X |
| 2,674,169 | 4/1954 | Sawyer .................. 403/324 X |
| 2,912,257 | 11/1959 | Shane .................... 280/460 A |
| 3,047,076 | 7/1962 | Wier et al. ............. 172/450 |
| 3,420,550 | 1/1969 | Rau ....................... 172/450 |
| 3,425,715 | 2/1969 | Weitz .................... 172/450 |
| 3,434,737 | 3/1969 | Bailey et al. .......... 280/461 A |

Primary Examiner—Cornelius J. Husar
Assistant Examiner—Todd G. Williams
Attorney, Agent, or Firm—Toren, McGeady, Stanger, Goldberg & Kiel

[57] ABSTRACT

A coupling assembly particularly for a trailer hitch or similar device, wherein a coupling hook is to be engaged about a coupling sphere including an annular retainer plate having a radially innermost conical support region and a radially outermost conical guide region formed integrally with each other opening away from said coupling sphere with the support region having an opening angle of about 156° and the conical guide region having an opening angle of less than 120°, the support region extending radially through about one-third of the total radial width of the annular retainer plate.

1 Claim, 2 Drawing Figures

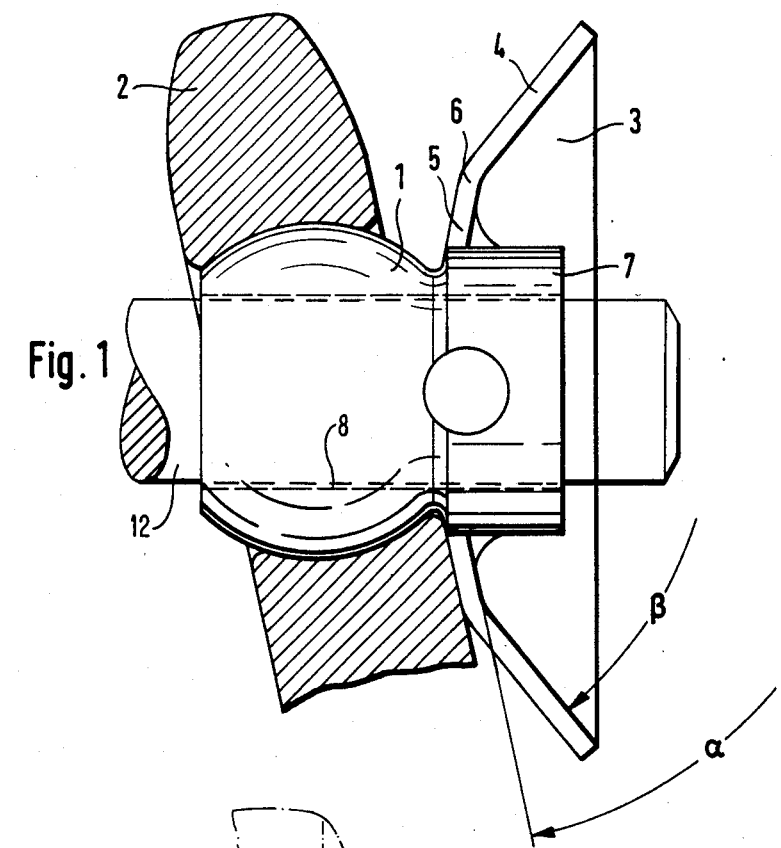
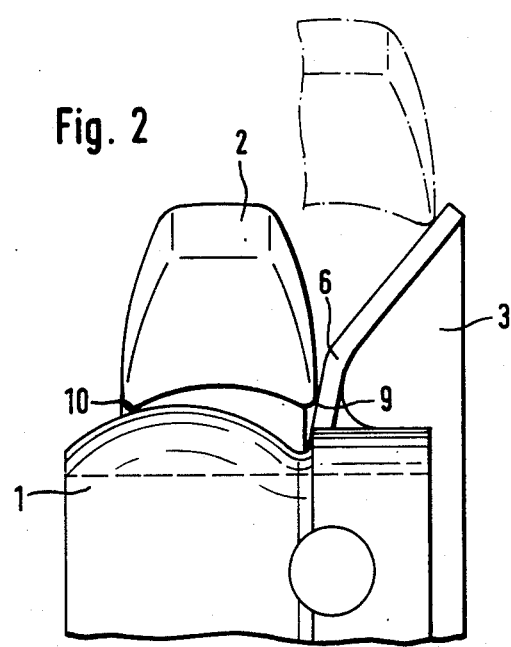

COUPLING ASSEMBLY HAVING A RETAINER PLATE FOR GUIDING A COUPLING HOOK

The present invention is directed generally toward coupling devices and more particularly to a coupling assembly for use with an agricultural attachment or trailer implement.

Generally, the invention is useful in connection with coupling assemblies such as trailer hitches and devices to which the present invention relates more specifically involve connecting of a lower coupling bolt of an agricultural attachment or trailer implement with a coupling hook disposed at the lower steering knuckle or pull rod of a three-point attachment device.

Devices of the type to which the present invention relates consists generally of a coupling sphere which is adapted to be connected with sliding engagement over a coupling bolt and secured against axial displacement. The invention is particularly directed toward a retainer plate shaped in the form of a frustum which is affixed with the coupling sphere and which serves to guide and retain a coupling hook which is to be attached with the coupling sphere.

In the prior art, it is known to equip the lower coupling pin of an agricultural attachment with oblique surfaces which are designed as conical dishes or discs in order to facilitate engagement of the generally spherically designed coupling pins with the coupling hooks of the lower pull or guide rods of a three-point tractor attachment mechanism. In this connection, reference is made to DE-OS No. 14 82 488.

In the mechanism described above, it is disadvantageous if the equipment to be pulled requires an excessively large angular sweep or operating traverse during road transport since this may imperil safe utilization of the vehicle.

In addition to the foregoing, a further disadvantage which arises in connection with prior art devices is that the retainer plate which is utilized with the assembly will be subjected to bending loads due to stresses occurring during operation in the field which, in many cases, will lead to distortion and/or damage of the retainer plate.

The present invention is directed toward providing a device with a retainer plate which is structured and configured so that it will act as a pivoting angle limiter for the coupling hook which is to be engaged with the coupling sphere and which will be able to withstand larger lateral loads, while, at the same time, assuring, within a large engagement area, proper guidance for the coupling hook as it approaches the point of engagement which may be located a substantial distance from the center of the coupling sphere.

SUMMARY OF THE INVENTION

Briefly, the present invention may be described as a coupling assembly or trailer hitch connecting device including a coupling hook arranged at a lower pull or steering rod forming part of a three-point attachment mechanism which is to be connected with a lower coupling bolt of an agricultural attachment or trailing implement. The assembly includes a coupling member having a coupling sphere which may be connected with the coupling bolt by sliding the sphere over the bolt so that they may be secured against relative axial displacement. The invention is particularly directed toward the structure and configuration of an annular retainer plate affixed on the coupling member adjacent to the coupling sphere for guiding and retaining the coupling hook on the coupling sphere. More particularly, in accordance with the invention, the retaining plate comprises a radially innermost support region which is located contiguously with the coupling member adjacent the coupling sphere and which is formed with a conical configuration opening away from the coupling sphere and having an opening angle of about 156°. Radially outwardly from the innermost support region, there is also formed a conical guide region which is integral with the support region and which is arranged perpendicularly thereabout with the conical configuration thereof opening away from the coupling sphere with an opening angle of less than 120°. The annular retainer plate is formed so that the innermost conical support region extends radially through about one-third of the total radial width of the annular retainer plate.

With a retainer plate structured in accordance with the present invention, advantages arise in that the support region, which operates as a pivoting angle limiting device for the coupling hook, is located so as to be closely adjacent the junction of the retainer plate with the coupling pin. Thereby, large bending moments which may exert stress on the retainer plate are avoided since such stresses could cause warping or distortion of the retainer plate.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE DRAWINGS

In the drawings:

FIG. 1 is a side view partially in section showing the supporting engagement of the coupling hook at the support region of the retainer plate while in the pivoted state; and FIG. 2 is a side view showing the process of engaging the coupling hook at the coupling sphere.

DETAILED DESCRIPTION OF THE PREFERRED EMBODIMENT

Referring now to FIG. 1, there is shown a coupling member in accordance with the present invention including a coupling sphere 1 and a cylindrical projection 7 with a retainer plate 3 being affixed contiguous with the coupling member adjacent the coupling sphere 1 so as to retain, support and guide a coupling hook 2 into engagement with the sphere 1.

The sphere 1 is adapted to be engaged with a coupling bolt 12 which may be connected with the sphere 1 by sliding engagement within a bore 8. The assembly of the invention is adapted to enable the coupling hook 2 to be engaged on the sphere 1 so as to enable connection with the coupling bolt which is engaged with the sphere 1 in a manner which will prevent relative axial displacement therebetween.

FIG. 1 shows the support of the coupling hook 2 at a support region 5 of the retainer plate 3 with the two parts in the fully swiveled position with respect to each other. In this position, the possible swiveling angle is limited to a maximum of 12°. No excessive moments occur at the connecting spot between the retainer plate 3 and the cylindrical projection 7 on the coupling sphere 1 due to the fact that the mating or engagement of the coupling hook 2 with the support region 5 is located radially inwardly insofar as the retainer plate 3 is concerned.

FIG. 2 depicts the attachment process of the coupling hook onto the coupling sphere 1. In comparison with known retainer plates, the point of engagement 9 at the support region 5 is moved so far in the direction of the coupling sphere 1 that this point of engagement occurs outside of the middle or center of the coupling sphere 1 and far outside of the area of irreversibility in the axial direction between the coupling hook 2 and the coupling sphere 1. This, in the first place, enables a subdivision of the retainer plate 3 so as to be formed to comprise a guide region 4 as well as the support region 5. The support region 5 does not initiate a large axially directed path for the coupling hook 2, rather, the hook 2 must align itself with the coupling sphere 1 due to the axial component created at point 10.

As will be seen from the drawing, the retainer plate 3 is arranged with both the support region 5 and the guide region 4 formed integrally with each other and both having a conical configuration opening away from the coupling sphere 1. As a result of the conical arrangement of the regions 4 and 5, there is formed therebetween a bend 6 which is integrally created between the guide region 4 and the support region 5 and which provides additional improvement in the strength of the entire retainer plate 3.

As will be seen from FIG. 2 and as particularly shown in dotted representation therein of the coupling hook 2, the arrangement of the invention shown in the drawing insures a rather large engagement or capturing area in an extreme acceptance spot at the retainer plate 3.

As will be noted from FIG. 1, the support region 5 is formed as a frustum and its conical configuration opens away from the coupling sphere 1 with an opening angle α of 156°.

The integrally formed radially outermost guide region 4 is also formed as a frustum having a conical configuration opening away from the capturing sphere 1 and the region 4 has an opening angle β which is less than 120°.

The overall dimensional arrangement of the retaining plate 3 is such that the support region 5 occupy about one-third of the total radial width of the annular retainer plate 3.

Thus, it will be seen that with a device structured such as that of the present invention, there is provided a retainer plate 3 which acts as a pivoting angle limiter for the accepted or engaged coupling hook and which is also able to carry large lateral stresses and which, moreover, assures within a large capturing or engagement area for the lead-in approach of the coupling hook a point of engagement located relatively far beyond the middle of the capturing sphere.

In accordance with the invention, the operating features of the invention are achieved in that the radially innermost support region 5 of the retainer plate 3 is provided with the opening angle α of 156° with the externally adjoining guide region 4 of the plate 3 being provided with the opening angle β which is less than 120°, the support region 5 occupying the inner one-third of the conically shaped retainer plate 3.

Inasmuch as the region 4 is directed at an angle which tapers away from the coupling hook 2 with a steeper orientation, it is unlikely that the hook 2 will apply stress forces at the outer edges of the plate 3 which will have high bending moments and which will tend to distort or damage the plate 3. Over and above this, a further advantage is provided in that the bend 6 formed between the support region 5 and the guide region 4 operates to considerably improve the strength of the plate 3.

A further advantage arises in that attachment of the coupling hook onto the coupling sphere 1 is facilitated by arranging the support point for the coupling hook 2 at the retainer plate 3 so close to the coupling sphere 1 during the attachment process of the coupling hook onto the coupling sphere that the attaching side of the coupling hook extends so far beyond the middle of the capturing sphere that the mating of the two parts with respect to each other occurs with certainty far outside the area of irreversibility for the axial sliding-on movement of the coupling hook onto the coupling sphere.

This very considerable advantage during the coupling process is obtained by the division of the retainer plate into an externally radially outermost located guide or engagement region 4 and an internally or radially innermost located support region 5.

While a specific embodiment of the invention has been shown and described in detail to illustrate the application of the inventive principles, it will be understood that the invention may be embodied otherwise without departing from such principles.

What is claimed is:

1. A coupling assembly for an agricultural attachment or trailer implement comprising:
   a coupling member including a coupling sphere adapted to be connected by sliding engagement over a coupling bolt;
   a coupling hook adapted to be connected with said coupling bolt by engagement over said coupling sphere; and
   an annular retainer plate affixed to said coupling member adjacent said coupling sphere for guiding and retaining said coupling hook on said coupling sphere, said retainer plate comprising
   a radially innermost support region affixed contiguously with said coupling member having a conical configuration opening away from said coupling sphere and having an opening angle of about 156°,
   a radially innermost guide region formed integrally with said support region and arranged peripherally thereabout opening away from said coupling sphere with an opening angle of less than 120°, with said support region extending radially through about one-third of the total radial width of said annular retainer plate.

* * * * *